Patented Apr. 21, 1953

2,636,014

UNITED STATES PATENT OFFICE 2,636,014

PLASTIC AND TEXTILE MATERIALS AND METHODS

Orlan M. Arnold, Grosse Pointe Park, Mich.

No Drawing. Application November 29, 1951, Serial No. 259,009

8 Claims. (Cl. 260—9)

This invention relates to plastic compositions in molded and fibrous forms, and to correlated improvements appertaining thereto, and to methods of making and treating such materials with particular reference to plastic compositions of the thermoplastic type. This application is a continuation-in-part of my co-pending application Serial No. 617,433, filed September 19, 1945.

One object of the invention is to improve the oxidation resistance of nylon and the like polyamide materials. A more specific object is the provision of ways of economically utilizing waste rayon, waste nylon, etc., etc. Another more specific object is the provision of means for improving the quality and prolonging the life of fabrics. Another object is the formation of novel and useful products containing polyamides. Still another object is the provision of an improved plastic for molding under heat and pressure. Other objects will in part be obvious and will in part appear more fully hereinafter.

I have discovered that when a synthetic organic fiber-forming linear superpolyamide is intimately associated with a cellulosic plastic material, preferably of the thermo-plastic type such as cellulose esters including cellulose acetate, cellulose butyrate, and cellulose acetate-butyrate, and cellulose ethers such as ethyl cellulose, and the resulting mixture subjected to heat and pressure as hereinafter more particularly described, there is obtained a heat- and pressure-consolidated plastic composition that possesses very desirable properties for manufacturing shaped plastic articles, including threads and fibers. By the term synthetic organic fiber-forming linear superpolyamide as sometimes employed in this specification, it is to be understood that I refer to the class of high molecular weight polymeric materials exemplified by the commercially available product known as nylon, as developed and manufactured by E. I. du Pont de Nemours & Co., of which various species are fully described in numerous du Pont patents and in the literature of fiber synthesis, including by way of example, the patents: Carothers 2,071,250-3, 2,130,948, 2,158,064 and 2,190,770. These polymeric materials may also be defined as "synthetic linear polycarbonamides wherein the average number of carbon atoms in the segments of the chain separating the amide groups is at least two," as in Schupp Patent No. 2,359,877. Textile nylon, with which this invention is primarily concerned for utilization of waste, is well known to be a linear super polymer formed by condensation of hexamethylene diamine and adipic acid and its chemical equivalents, when spun into filaments and cold-drawn to give fibers with molecular orientation longitudinal of the fiber axis. Since this component of my composition is well known and is not per se my invention, further reference thereto is deemed unnecessary in the interests of brevity.

I have found that when nylon is covered or otherwise intimately associated with a film of cellulosic plastic material and especially a cellulose ester, desirably cellulose acetate or butyrate, etc., the resulting product is less subject than the nylon alone to deterioration by oxidation, even at softening temperatures, and that the product is in general more heat-resistant. By combining in this way cellulosic plastic materials and the like with nylon, I have discovered that used nylon fabric and other waste nylon materials may be efficiently utilized in the production of new compositions, such as plastics and fibers, which possess not only the desirable properties of one or both of the components but also other desirable properties which are not found in either of the components of the composition. For example, the product obtained by heating waste cellulose acetate and nylon fabric together, with or without mechanical working and fluid pressure, has a higher fusion point than either the cellulose acetate or the nylon alone.

I have good reason to believe that a chemical combination takes place between the cellulosic component and the nylon component by which molecules of these respective polymeric materials are tied together into longer chains or supercopolymers. At the same time adjacent fibers may be fused together by chemical linkages at points of contact. However, while there is indeed good reason to believe that a true chemical combination takes place, it is nevertheless to be understood that I do not regard myself as bound by any such theory, however plausible, and that my invention is based upon the association of the materials as and in the manner described hereinafter irrespectively of whether or not chemical combination takes place.

It is only necessary and generally desirable to apply a very thin film of the organic cellulosic plastic material to the nylon or other polyamide fiber or film, but more can be used if desired. I have, for example, used proportions of the organic cellulosic plastic material, such as cellulose acetate, of from 2% to 60% and more by weight of the nylon, but I have also found that generally speaking the best results are obtained when operating in the range of from 2% to 30% based on the weight of the nylon. Furthermore, I have additionally found that from 2% to 10% of the cellulosic component, based on the weight of the nylon in the composition, represents the optimum range for best all-around results.

While I have referred to the feature of applying a very thin film or sheath of the cellulosic plastic material to nylon fibers which have been oriented by stretching, the process of the present invention may also be thought of as involving fundamentally the intimate association of the polymeric molecules of the aforesaid principal components of the composition; but the use of oriented nylon and dissolution of the cellulose facilitates the coming together of the respective molecules in aspect favorable to the desired cross-linking or bridging.

Although I have not yet been able to prove beyond question what is the precise nature of the reaction of the cellulosic and nylon components under this treatment, I have observed that reaction products of the nature herein set forth are in fact produced. Moreover, such reaction is promoted by heating the components of the composition to temperatures above about 190–225° C. and by the application of superatmospheric pressure and/or mechanical working thereto. It has been found that to some extent the range of temperatures may be extended downward if mechanical working and/or time of heating are increased. In any case, I prefer to employ temperatures in the range of from about 150° C. to as high as 400° C. depending upon the exact nature of the components of the composition, the time of treatment and the degree of working. In general, it is desirable to heat the composition to as high a temperature as is feasible, it being only essential in any given case to avoid temperatures at which the composition will suffer serious degradation, having due regard to the time of exposure of the composition to such temperature and to other conditions of such exposure including presence of oxygen or other chemically active material.

In many instances, useful products may be formed of waste nylon and cellulose, cellulose ester or cellulose ether fabrics mixed together in the presence of solvents, plasticizers and/or other reactive materials. Desirably, whatever such materials are utilized should be of relatively low volatility in view of the high fusion point of the resulting cellulose-nylon plastic composition. Examples of desirable materials for use as plasticizers for the polyamide-cellulose acetate plastic are triphenyl phosphate, tricresyl phosphate, and various chlorinated diphenyls, such for example as "Arochlor No. 1248" or "Arochlor No. 1262" available from the Monsanto Chemical Company. Acetone and ether are effective solvents or vehicles in forming a plastic composition from polyamide waste material and cellulose acetate waste material where only temporary softening is required. Plastic masses, formed by combining nylon and cellulose acetate, e. g., applied in acetone solution, can be pulled out like nylon itself into good strong fibers with advantageous properties as indicated above and likewise can be compressed and molded into hard, smooth, tough, machinable products of uniform texture. The aforesaid plastic masses are preferably formed by mixing nylon fiber and a solution of cellulose acetate in acetone, subjecting the mixture to agitation in a suitable mixing device to insure uniform distribution of the cellulose acetate over the nylon fiber, and thereafter subjecting the mixture to heat and pressure as hereinafter described.

Polystyrene may also be used as more fully described in my co-pending application Serial No. 617,432, filed September 19, 1945, now Patent No. 2,550,650.

Whether or not polystyrene or other reactive material is present in the composition, the amounts of cellulose acetate or other cellulosic plastic material, and nylon may vary with respect to each other, as indicated above.

In certain instances, instead of utilizing waste fabric as a source of cellulose ester, cellulose acetate, butyrate, etc. may be prepared independently in the form of a solution in a suitable vehicle and mixed with waste nylon fabric or fibers, with or without polystyrene. The cellulose ester (and the polystyrene or styrene monomer, if used) may be dissolved in a suitable solvent, for example acetone, and the resulting solution mixed with or sprayed upon the fibrous polyamide base material. Alternatively, the fibrous polyamide material may be dipped in such a solution of the organic cellulosic plastic material in order to thoroughly impregnate same with the latter. The vehicle or solvent may then be evaporated before or during the use or further treatment of the mixed material.

A good cellulose ester material is an acetate-butyrate mixed ester such as is employed for making fiber-spinning solutions.

As one example of my invention, scrap cellulose acetate rayon may be dissolved in sufficient acetone to form a thin, slightly sirupy solution. The resulting solution is placed in a covered vessel and nylon yarn, thoroughly cleaned and freed from wax and oils, is passed continuously through the solution as an impregnating bath. The impregnating operation is facilitated by the use of squeeze rolls immersed in the bath and/or by the application of a vacuum to the impregnating vessel. As the yarn is withdrawn from the bath it passes between wringer rolls to remove excess solution and may then be passed into a drying chamber where the acetone is vaporized off or into a bath of petroleum ether, benzene, carbon tetrachloride or the like, where the acetone is leached out, leaving the cellulose acetate as a uniform, finely fibrous deposit on the individual fibers of the nylon. The impregnated yarn, before or after removal of the solvent, is heated to about 75° C. (e. g., 60° C. for petroleum ether, 75° C. for benzene, and 80° C. for carbon tetrachloride), preferably in an inert atmosphere or bath, and when cooled and dried it is ready for use for weaving, knitting or other textile purposes.

Instead of cellulose acetate, cellulose butyrate or butyrate-acetate, I may use other cellulosic plastic materials such as a cellulose ether solution, e. g., an alcohol solution of ethyl cellulose, or the nylon may be coated with regenerated cellulose by treating with a cuprammonium solution of cellulose or a viscose solution of cellulose xanthate, and then precipitating the cellulose onto the nylon by leaching in the usual coagulating baths commonly employed in the cuprammonium and viscose rayon industries, respectively. In all such cases, the coated polyamide yarn is advantageously heated above about 100° C. to drive off residual solvent. The product of such treatment may be used for improved textiles, but is also useful for making the novel plastic or reforming of fibers according to the present invention.

Instead of treating nylon in the form of yarn, I may treat other textile fabrics, e. g., woven cloth, knitted stockings, newly formed fibers before spinning into yarn, or short fibers released from scrap or rag by various reclaiming methods well known in the art. Unspun and unwoven materials, such as felt, sliver, bat, etc., may be treated in like manner, as well as even dense, transparent films similar to "cellophane."

Other polymers may, if desired, be combined with the cellulosic plastic materials, such as polymers and copolymers of styrene, other vinyl compounds, butadiene, etc.

In particular, I have found that a product formed from cellulose acetate, nylon and the like polyamides, and styrene (either in the monomeric or polymeric state or both) has exceptionally advantageous and unexpectedly desirable properties. It is not clear to just what extent these materials dissolve or otherwise plasticize one another and to what extent they form addition products or cross-linked superpolymers or otherwise assist in the mutual polymerization of another. There are evidences of each of a number of types of effects including plasticization, combination, and co-polymerization of the respective polymeric components. In any event, the process is highly effective and the product highly advantageous, and, as indicated above, I do not desire to be bound to any particular theory of formation.

For example, a high quality plastic composition is produced from polyamide material with polystyrene and cellulose acetate as follows: 20 parts by weight of polyamide in the form of waste nylon stocking material, 2 parts by weight of waste rayon material of the cellulose acetate type, and 1 part by weight of white crystalline polystyrene are ground together for about 8 to 10 minutes in a Banbury mixer cooled to maintain a temperature of about 65° C. in the mass during working. A plasticized mass which can be effectively molded or extruded is produced in this manner. When molded under 150–200 pounds per square inch pressure at approximately 250–275° C., there is obtained a heat- and pressure-consolidated mixture of the components in the form of a plastic composition which is hard, smooth, light-weight, of low distortion, and of otherwise unique characteristics. When extruded through narrow orifices the extrudate may be drawn out rapidly into textile fibers or filaments. The pulling out or spinning of the nylon-containing composition, as well preferably as the initial molding thereof, is performed in an inert atmosphere, such for example as nitrogen, or an inert liquid, such for example as hot hydrocarbon oils, or with other sutiable precautions against oxidation of the nylon. Well oriented fibers can be obtained by drawing out at high velocity in a cool atmosphere from a heated mixture. Lower temperatures in the drawing atmosphere can be utilized to help protect against degradation, but too rapid cooling may reduce the strength of the final composition, so that it is generally more desirable to immerse the drawn or molded plastic composition in an inert bath or atmosphere maintained at a desirable aging temperature.

The treated materials of my invention may be used for molding as well as for textile uses. Scrap nylon fabric, before or after treatment according to the present invention, can be reduced to short fiber form suitable for use in plastic molding and can be treated with the cellulose acetate or other cellulosic plastic material in bat or loose fiber form if not previously treated.

As another example of the invention, I dissolve 1 part by weight of bright acetate rayon scrap in 45 parts by weight of acetone. Nylon fibers are cut into short lengths, less than about 1.5 inches to substantially avoid forming of tangled masses of fiber on mixing. The acetate solution is then sprayed onto the nylon fiber in a tumbling type mixer, the proportion of dissolved cellulose acetate being about 10% by weight of the nylon fiber. The acetone is then evaporated and the product is dried in a mixer where it is fluffed up, e. g., by a paddle. In the final stage of the drying a current of air warmed to a little less than 50° C. is passed through the material and/or it is subjected to vacuum.

The dried product is then charged into a Banbury mixer and worked therein for 10 minutes during which the temperature rises to about 190° C.

The proportion of cellulose acetate to nylon may be varied down to about 2% and up to about 30%. The temperature can be kept down as low as 150° C. if the cellulosic material is sufficiently plasticized, but for practical results under commercial conditions 190° C. should be regarded as the lower limit.

Instead of the Banbury mixer one may use other heavy mixers available to the plastics industry and especially screw-type continuous extruding plastic mills such as that patented by Gordon.

The product to be sold is a cellulose acetate protected nylon extruded and cut into pellets of convenient size for use in ordinary molding operations. If the mixing has been done in a Banbury or other batch machine, the product is advantageously put through a separate extruder and cut into pellets.

The concentration of the cellulosic solution can be varied to suit convenience, for example I have used a concentration of 1 part cellulose acetate waste fiber to 5 parts acetone.

For molding treated nylon fibers it is often desirable to use pressures of from 100 to 2000 pounds per square inch or more at temperatures of from 150 to 300° C. or even as high as 400° C.; lower pressures being used with higher temperatures longer time and softer material, and lower temperature for higher pressures, longer time and softer material, and vice versa. The time of exposure to the higher temperatures is sufficiently short in all cases as to prevent serious heat degradation of the composition. The compositions obtained according to my invention may be utilized in molding operations with greater ease and fewer precautions than nylon. This may be at least in part because one or both of the other principal components of the composition satisfy the oxygen-receiving bonds of the nylon, and it may be at least in part because they physically protect the nylon from oxidation, and it may be due at least in part to some other action not now fully understood. Nevertheless, it is desirable to keep the temperature relatively low in the Banbury mixer, or other plastic milling machine, as well as in subsequent treatments, unless inert protective fluids are employed. If it is desired to employ higher temperatures in the Banbury mixer (or later in the process) that are in the higher end of the temperature ranges given herein, reactive agents such as oxygen should be excluded by carrying out the steps of the process in an inert atmosphere, such as nitrogen.

Instead of heating the treated nylon material at once, it may be merely dried and then woven, felted, spun or compacted in a mold and then heated to a temperature near its softening point. The result is an exceptionally well-bonded, strong, heat-resistant product.

Also, while I have described my invention with particular reference to nylon fibers coated with organic cellulosic plastic materials, and compositions comprising such ingredients, in its broader aspects it includes other fibrous materials and other coating materials wherein an interreaction occurs forming a super-co-polymer by which the coating becomes integrally fused into the modified fiber.

While I have frequently used the terms "nylon" and "synthetic organic fiber-forming linear superpolyamide," as a matter if fact I have obtained best results with the utilization of waste nylon from commercial sources, which nylon is substantially water insoluble and fusible, and which I understand to be a condensation polymer of hexamethylene diamine and adipic acid manufactured by a process that includes cold-drawing filaments of said polymer into fibers exhibiting by X-ray examination molecular orientation along the fiber axis and it is to be understood that I regard such materials as most advantageous for use in practicing my invention; other nylon may also be similarly employed with some of the advantages of the invention.

When the nylon is employed in fibrous form, it is generally convenient to subdivide it into short lengths of fiber for intimate admixture with the organic cellulosic plastic material. However, it is possible to employ non-fibrous nylon in practicing the present invention, provided it is subdivided to present a high surface/volume ratio, thereby insuring intimate contact between the solution of the organic cellulosic plastic material and the subdivided nylon particles, which thereby receive a uniform coating of the cellulosic solution which, upon application of heat and pressure, is converted into a sheath or film surrounding and protecting the subdivided nylon and together with the latter forming a heat- and pressure-consolidated mixture having the desired properties according to the present invention.

The organic cellulosic plastic material and the nylon may be separately preheated prior to admixture and then subjected to further heat and pressure in a mold to bring about the formation of the desired final product, or these components may be admixed directly in the mold provided the mold is equipped with agitating means in order to bring about an intimate mixture of the components, and thereafter immediately subjected to heat and pressure in order to bring about the production of the desired product.

If desired, pigments, plasticizers, heat-resistant organic dyes and/or fillers may be incorporated as modifiers in any amount necessary to confer the desired modified properties upon the resulting composition.

As illustrating the production of high quality plastic compositions from nylon and cellulose esters without the use of polystyrene, waste nylon fibers of short length are mixed with an acetone solution of cellulose acetate of sirupy consistency and of such an amount that the cellulose acetate is present in the composition to the extent of 2% by weight of the nylon. This mixture is then heated to about 190–225° C. with agitation in order to bring about intimate admixture of the components and evaporation of most of the solvent. The mass is then transferred to a conventional molding press where it is molded under 150–200 pounds per square inch pressure at approximately 250–275° C., and in an inert atmosphere of nitrogen, to produce a hard, smooth, lightweight heat- and pressure-consolidated mass of horn-like appearance. This composition is tough and machinable into shaped products of uniform texture, and can be melt spun into thermoplastic filaments having desirable properties for weaving and other textile-fabrication operations.

The foregoing procedure is repeated but this time employing the cellulose acetate solution in an amount sufficient to provide 5% cellulose acetate in the composition based on the weight of nylon. The final molded product possessed similarly desirable properties, both as regards toughness and machinability and as regards its ability to be spun into useful textile fibers.

Although I have given above certain specific examples of my invention and its application in practical use and am giving also certain modifications and alternatives, it should be understood that these are not intended to be exhaustive or to be limiting of the invention. On the contrary I am giving these as illustrations and am giving explanations herein in order to acquaint others skilled in the art with my invention and the principles thereof and a suitable manner of its application in practical use, so that others skilled in the art may be enabled to modify the invention and to adapt it and apply it in numerous forms, each as may be best suited to the requirements of a particular use.

I claim:

1. A process of manufacturing a hard, tough, plastic composition from a preshaped synthetic organic film-forming linear polycarbonamide wherein the average number of carbon atoms in the segments of the chain separating the amide groups is at least two and a cellulosic material selected from the class consisting of cellulose ethers, cellulose esters and regenerated cellulose, comprising intimately admixing said preshaped polycarbonamide in finely divided form with from 2 to 60% by weight thereof of said cellulosic material, and consolidating said mixture into said hard, tough, plastic composition by subjecting said mixture to pressure and elevated temperatures of at least about 100° C.

2. A process as defined in claim 1 wherein the cellulosic material is employed in the range of from 2 to 30% by weight of the preshaped polycarbonamide.

3. A process as defined in claim 1 wherein the cellulosic material is employed in the range of from 2 to 10% by weight of the preshaped polycarbonamide.

4. A process of manufacturing a tough, plastic composition from a preshaped synthetic organic film-forming linear polycarbonamide wherein the average number of carbon atoms in the segments of the chain separating the amide groups is at least two and a cellulosic material selected from the class consisting of cellulose ethers, cellulose esters and regenerated cellulose, comprising intimately admixing said preshaped polycarbonamide in finely divided form with from 2 to 30% by weight thereof of said cellulosic material, initially mixing at a temperature below 100° C., heating the mixture to a temperature of at least 150° C., and thereafter consolidating said mixture into said tough, plastic composition by applying heat and pressure to the mixture.

5. A process of manufacturing a tough, plastic composition from a preshaped synthetic organic film-forming linear polycarbonamide wherein the average number of carbon atoms in the segments of the chain separating the amide groups is at least two and a cellulosic material selected from the class consisting of cellulose ethers, cellulose esters and regenerated cellulose, comprising intimately admixing said preshaped polycarbonamide in finely divided form with from 2 to 30% by weight thereof of said cellulosic material, initially heating the mixture to a temperature of at least 150° C., and thereafter consolidating said mixture into said tough, plastic composition by heating said mixture at pressures of at least 100 pounds per square inch at temperatures of at least 90° C.

6. A process as defined in claim 5 wherein the cellulosic material is employed in the range of from 2 to 10% by weight of the preshaped polycarbonamide.

7. A process as defined in claim 1 wherein said preshaped polycarbonamide consists essentially of waste from commercial sources.

8. A process as defined in claim 1 wherein said preshaped polycarbonamide is a condensation polymer of hexamethylene diamine and adipic acid manufactured by a process that includes cold-drawing filaments of said polycarbonamide into fibers exhibiting by X-ray examination molecular orientation along the fiber axis.

ORLAN M. ARNOLD.

References Cited in the file of this patent

UNITED STATES PATENTS

| Number | Name | Date |
| --- | --- | --- |
| 2,190,770 | Carothers | Feb. 20, 1940 |
| 2,285,178 | Thinius | June 2, 1942 |
| 2,347,525 | Thinius | Apr. 25, 1944 |
| 8,416,890 | Amende et al. | Mar. 4, 1947 |